April 24, 1951  J. C. BURKHOLDER  2,549,888
RECTIFIER PLATE
Filed Oct. 9, 1948

INVENTOR
JOHN C. BURKHOLDER
By: Fetherstonhaugh & Co.
ATT'YS

Patented Apr. 24, 1951

2,549,888

UNITED STATES PATENT OFFICE 2,549,888

RECTIFIER PLATE

John Charles Burkholder, Toronto, Ontario, Canada

Application October 9, 1948, Serial No. 53,707

4 Claims. (Cl. 175—366)

This invention relates to a self-heat limiting alternating current rectifying device of the dry-plate type.

In conventional types of dry-plate alternating current rectifiers, particularly of the selenium type, the plates thereof often become damaged due to excessive heating conditions arising from overload. In the past, thermal switch devices have been utilized whereby a bi-metallic element has been disposed to receive heat from the rectifier plates and to actuate circuit switch means whereby the electrical circuit including the rectifier is opened.

A serious disadvantage is attendant in dry rectifier plate arrangements having thermal switch safety devices of the above character in that a time delay is involved in transferring the heat from the unduly heated rectifier plate or plates to the heat distortionable or actuable switching member. Often the time delay is sufficient to allow the rectifier plates to become permanently damaged before the electrical circuit, which includes the rectifier, is opened.

It is the particular object of the present invention to provide an alternating current rectifier stack of the dry-plate type wherein at least one plate thereof has at least a portion thereof which includes a metal member having a different co-efficient of thermal expansion than the main body metal of the plate to form a bi-metallic portion and wherein the plate itself serves in the rectifying action whereby the said bi-metallic portion is directly heated.

Another object of the invention is to provide a plate for a rectifier stack as before wherein the bi-metallic portion is disposed to engage and actuate a switching device when the bi-metallic member is distorted a predetermined amount by a predetermined temperature existing in the rectifier stack, the said switching device being electrically in series with the rectifier stack and when actuated being designed to open the circuit thereof.

Other objects of the invention will be appreciated by a study of the following specification taken in conjunction with the accompanying drawings.

Figure 1:
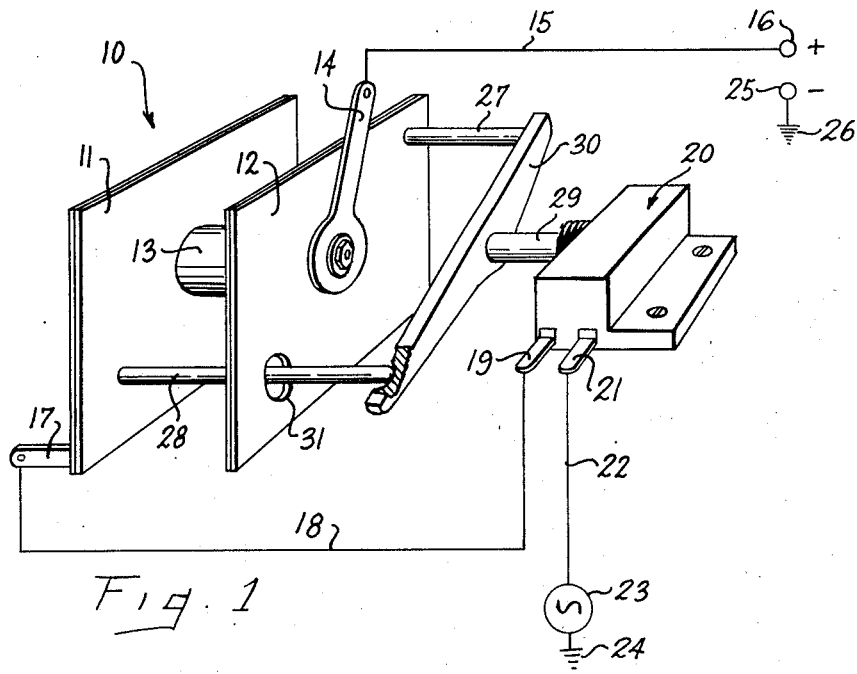
Figure 1 is an indicative diagrammatic perspective view of a rectifier stack of the dry-plate type wherein the plates are of bi-metallic form and include means for actuating a sensitive switching device of any suitable form, the general electrical arrangement being disclosed also in this figure.

Referring to the drawings Figure 1 illustrates a very simplified form of rectifier stack 10 formed of rectifier plates 11 and 12 separated by a conventional separator 13. The rectifier stack may be of the selenium or copper oxide type or any other type conventionally used in dry metallic plate type rectifiers.

The member 14 is the positive lead from the stack 10 and connects by the wire 15 to the positive terminal 16. The terminal strip 17 of the plate 11 is the input terminal of the stack 10 and connects by the line 18 to the terminal 19 of the sensitive switch device 20. The terminal 21 of the latter switch device connects by the line 22 to a source of alternating current 23 having the other side grounded as at 24 if desired, in which case the other terminal 25 of the output is grounded as at 26.

Figure 4:
Figure 4 illustrates the distortion of a bi-metallic rectifier plate member due to heating and made according to the present invention.

According to the invention rectifier plates 11 and 12 in the form illustrated are bi-metallic in nature and are distortionable under heating to the shape illustrated in Figure 4 to a substantially dish shape. In Figure 1 all of the rectifier plates of the stack 10 are shown having actuating members extending therefrom as indicated by numerals 27 and 28 to cause actuation of the actuating member 29 through the crossbar 30 mounted on the latter. The plate 12 has an enlarged hole 31 for free accommodation of the actuating member 28. As the blades 11 and 12 are distorted due to heating actuating member 29 of the switch device 20 will be moved inwardly and at some point determined by the particular type of switch device employed the latter will be actuated to open the circuit and the rectifier stack by discontinuing electrical continuity between the contacts 21 and 19.

The arrangement discussed above with reference to Figure 1 of course is illustrative only of one arrangement which might feasibly be employed. Whether one plate only of a stack is of the bi-metallic type or a number of plates are of the bi-metallic type according to the invention, it is generally a matter of choice but in some instances will be governed by specifications to be met concerning a permissible distortion of the various plates for the stack. Obviously however, wherein a rectifier stack includes one plate of the bi-metallic type according to my invention which also serves in the rectifying action, a switching device may be directly actuated thereby without requiring the mechanical arrangement described with reference to Figure 1. Thus, the actuating member 29 could be placed in direct engagement with the distortionable portion of a rectifier plate.

Figure 2:
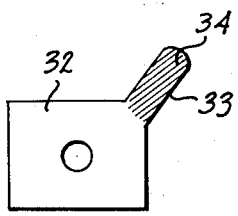
Figure 2 illustrates an alternative form of rectifier plate having a bi-metallic member extending therefrom to form a part thereof.

Figure 2 illustrates an alternative form of rectifier plate 32 having a portion thereof in the form of a projection 33 which has adhered thereto a layer of metal 34 having a different co-efficient of thermal expansion than the material in the body of the plate. The plate 32 is preferably used only with plates of the same design in rectifier stacks so that the portion 33 also serves in the rectifying action. It will be appreciated however, that conduction through the body material is rapid and that a rectifier stack having one plate of the form illustrated in Figure 2 would be practical according to the invention and would largely avoid the disadvantages of prior constructions wherein the heat is transferred to a temperature responsive switching member largely by radiation, rather than by direct conduction as in the present case.

Figure 3:
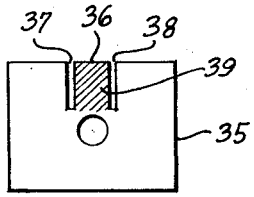
Figure 3 is a further alternative form of rectifier plate having a bi-metallic portion indicated by the shaded area thereof.

Figure 3 illustrates a further alternative form of rectifier plate 35 having a portion 36 in the body material thereof separated from the remainder of the body by the slots 37 and 38 and such that the portion 36 is free to bend. Applied to portion 36 of the body material is an area of metal 39 having a different coefficient of thermal expansion than the body material to form a bi-metallic member or portion. In this instance the bi-metallic portion 36 may be treated to serve also in the rectifying action when the plate is assembled in a rectifying stack. The portion 36 may be exposed to engage and actuate the actuating member of a suitable switching device to carry out the desired circuit function discussed with reference to Figure 1.

It is desired that the present disclosure should not be construed in any limiting sense other than that indicated by the scope of the following claims.

What I claim as my invention is:

1. In an alternating current rectifier stack of the dry-plate type at least one rectifier plate formed from a main body of metallic material having a rectifying portion, and a bi-metallic switch actuating portion in common metallic heat conducting circuit with and forming a part of the rectifying portion of said main body of metallic material.

2. A rectifier plate of the dry-plate type designed for assembly with other plates of a similar type comprising, a main body of metallic material, an electrical alternating current rectifying portion in said body and a bi-metallic switch actuating portion in common metallic heat conducting circuit with and forming a part of said rectifying portion of said main body of metallic material.

3. A rectifier plate as claimed in claim 2 in which said bi-metallic switch actuating operation is in the form of an elongated finger.

4. A rectifier plate of the dry-plate type designed for assembly with other plates of a similar type and comprising, a main body of metallic material, an oxide coating extending over certain surfaces of said body to form a rectifying portion thereof to serve in a rectifying action in conjunction with exposed surfaces of adjacent plates when assembled therewith, and a metal portion of different thermal expansion co-efficient than the metallic material of said body fixed to the said rectifying portion of the latter to form a thermally responsive member in conjunction with the portion of the body to which it is adhered.

JOHN CHARLES BURKHOLDER.

REFERENCES CITED

The following references are of record in the file of this patent:

UNITED STATES PATENTS

| Number | Name | Date |
| --- | --- | --- |
| 1,738,113 | Ogden | Dec. 3, 1929 |

FOREIGN PATENTS

| Number | Country | Date |
| --- | --- | --- |
| 850,912 | France | Sept. 18, 1939 |